United States Patent [19]

Halvorson

[11] 3,898,755

[45] Aug. 12, 1975

[54] DUCK RETRIEVING DEVICE
[76] Inventor: George C. Halvorson, 7528 Girard Ave. South, Richfield, Minn. 55423
[22] Filed: Nov. 13, 1972
[21] Appl. No.: 305,717

[52] U.S. Cl. .................................................... 43/1
[51] Int. Cl. .................................................. A01m
[58] Field of Search ...... 43/1, 3, 42.39, 26.2, 44.96, 43/42.7; 294/66 R

[56] References Cited
UNITED STATES PATENTS

| | | | |
|---|---|---|---|
| 1,527,711 | 2/1925 | Stallman | 43/3 |
| 2,444,597 | 7/1948 | Erickson | 43/1 |
| 2,471,231 | 5/1949 | Miller | 43/1 |
| 2,522,692 | 9/1950 | Speer | 294/66 R |
| 2,599,128 | 6/1952 | Roberts | 43/26.2 |
| 2,878,611 | 3/1959 | Netherton et al. | 43/42.39 X |
| 3,530,612 | 9/1970 | Gurka | 43/42.39 X |

Primary Examiner—Louis G. Mancene
Assistant Examiner—J. Q. Lever
Attorney, Agent, or Firm—Stuart R. Peterson

[57] ABSTRACT

A buoyant plastic body is formed with an upwardly sloping front end. Held in place against the sloping front end is a unit comprised of two forwardly projecting hooks. A pair of weight members are embedded in the lower portion of the body near the rear end thereof. In this way, an optimum approach angle for the hook unit is provided as the body is pulled toward a downed water fowl by means of a conventional fishline. Two laterally spaced keels extend along the bottom of the body and add to the stabilized control provided by the weight members. Entanglement with reeds or other water weeds is minimized by a pair of laterally projecting wings at the front end.

15 Claims, 7 Drawing Figures

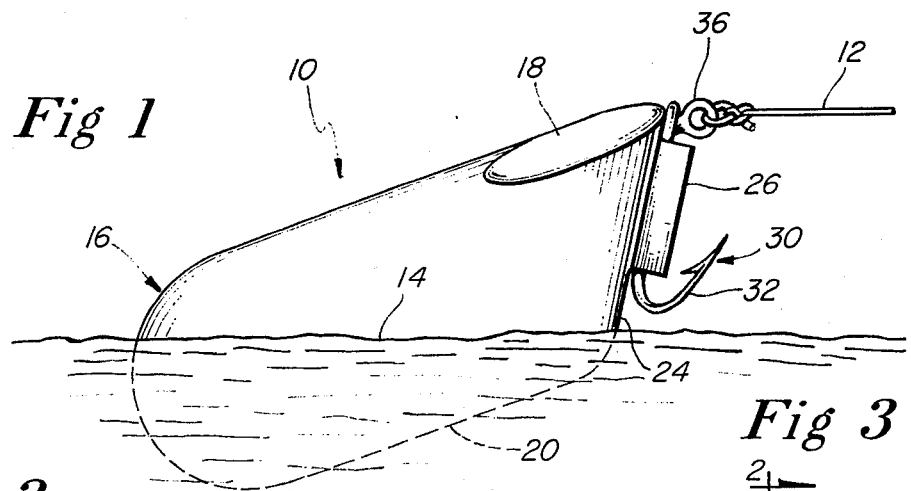
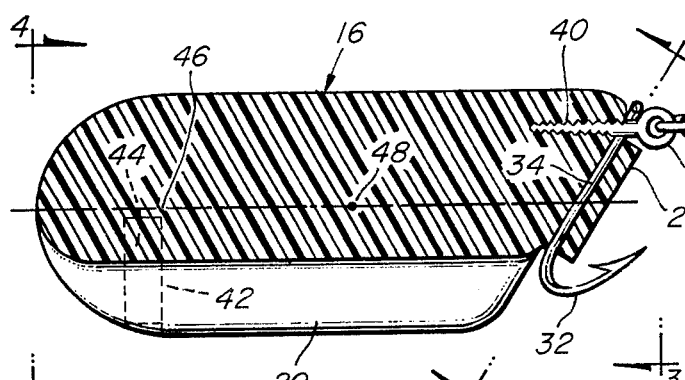
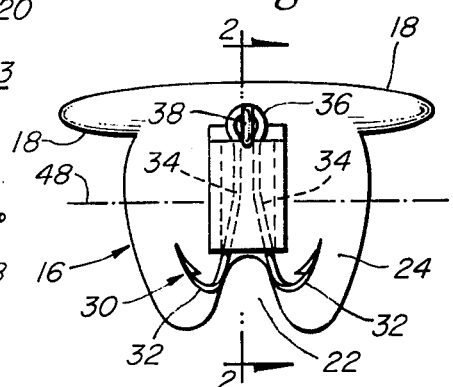
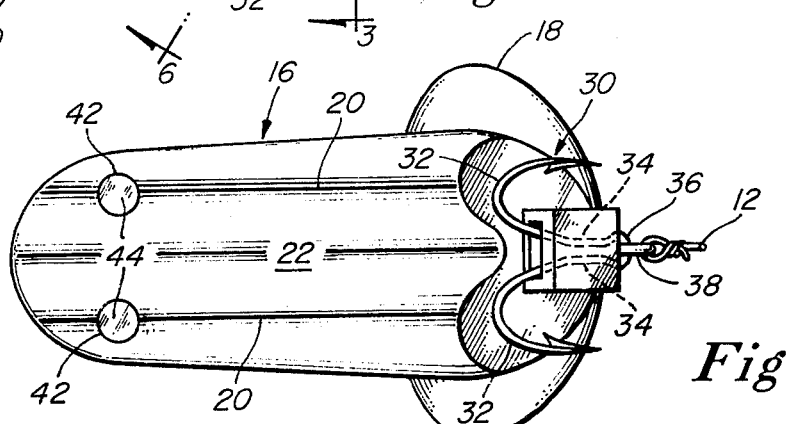
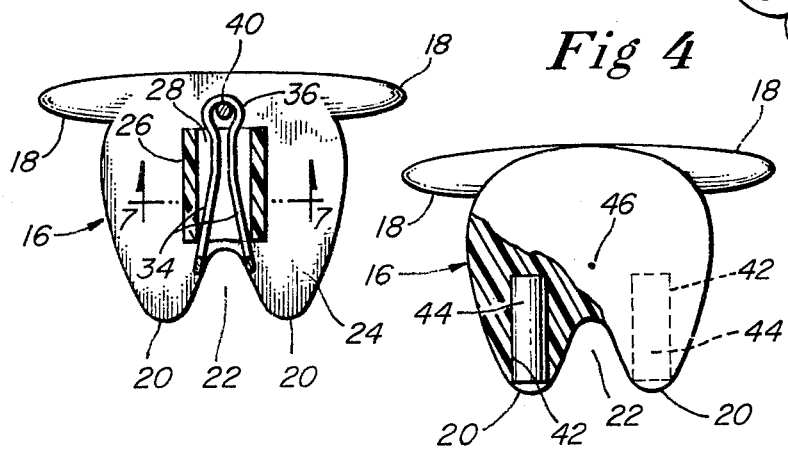
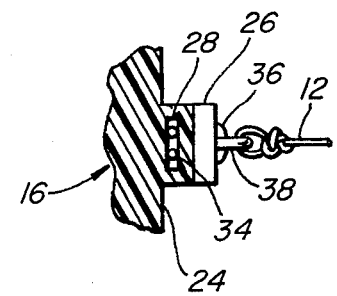

DUCK RETRIEVING DEVICE

BACKGROUND OF THE INVENTION

1. Field of the Invention

This invention relates generally to the retrieving of water fowl after being shot down by hunters, and pertains more particularly to a retrieving device that can be cast in the direction of the floating bird when attached to the end of a fishline, the fishline then being employed to pull the device in a direction to snag the fowl.

2. Description of the Prior Art

A number of contrivances have been devised for the retrieving of ducks and the like shot down by hunters and which are inconveniently floating off shore. For the most part, these prior art arrangements make use of some form of hook, although at least one attempt has been made to encompass the entire bird with a crate-like structure when effecting its retrieval. Those devices having the greatest similarity to my retriever, in that they are intended to be cast in the direction of the floating bird by means of a fishing rod and line, are either extremely complicated and costly or must engage a particular portion of the bird, such as its neck or wings, thereby rendering the retrieving of the fowl more difficult. Some retrieval means are also quite large and bulky, thereby rendering them inconvenient and cumbersome to both use and store. A common shortcoming with most of the prior art devices resides in the lack of a stabilized travel through the water as the device is being pulled in the direction of the felled bird, thereby adversely affecting its path of travel. Also, the angle at which such devices approach the bird is usually uncontrolled. The net result is that the retrieval is either unsuccessful or rendered more difficult and time-consuming than it should be. Also, a number of prior art retrieving devices are likely to become snagged on submerged or water-level logs, weed beds and the like.

SUMMARY OF THE INVENTION

Accordingly, a prime object of the present invention is to provide a duck retriever that can be readily cast, yet which can be accurately pulled in the direction of the floating bird. More specifically, an aim of the invention is to provide a stabilized travel as the device is pulled through the water and to provide excellent control of the device as it approaches the felled fowl so that it is in position to securely hook the bird for the remaining portion of the retrieval operation.

Another object, which is closely allied with the foregoing main object, is to provide a retrieving device that can be employed to effectively hook virtually any portion of the downed bird. In other words, it is not necessary to engage, say, the neck or wing, for any part of the bird can be securely hooked so that the bird can then be pulled through the water without fear of loss.

A further object is to provide a duck retriever having a configuration which permits efficient casting, the device being generally bullet-shaped so as to minimize wind resistance and to maximize directional accuracy.

Another object of the invention is to provide a retriever of the foregoing type which will be virtually weed-free, provision being made for causing the device to glide over lily pads, reeds and other weeds that may be encountered as the retriever is being pulled in the direction of the floating bird, Still another object of the invention is to provide a low cost type of duck retriever. In this regard, it is planned that a conventional fish hook unit be employed and also that the body of the device be readily molded of inexpensive plastic material. It is also within the aim of the invention to easily replace the fish hook unit should it become necessary to do so by reason of rusting, breakage during storage or actual rough usage (such as from careless casting onto rocks or striking such obstacles as the device is being pulled), to permit sharpening of the barbs, or for any other reason that might arise.

Briefly, my invention contemplates an elongated body of expanded plastic, such as polyethylene, having an upwardly inclined front end to which a hook unit having two hook ends is attached. The upper end of the hook unit provides an eyelet for attaching the device to the end of a fishline. The bottom of the body is formed with a pair of keels which extend throughout the length thereof. Weight means in the form of two weight members are embedded in the body near the rear thereof, in this way providing the proper tilt or angle for the device as it is pulled through the water. Wings at each side minimize the likelihood of the device becoming entangled with weeds, the wings shielding the hooks from vertical reeds and other protruding objects. The wings also aid accuracy in casting my device toward the bird to be pulled from the water.

BRIEF DESCRIPTION OF THE DRAWING

FIG. 1 is a side elevational view of a retrieving device exemplifying my invention, the view depicting the device as it is being pulled through the water by means of a fishline prior to impaling a felled water fowl;

FIG. 2 is a longitudinal cross sectional view taken in the direction of line 2—2 of FIG. 3, the view showing the device in a horizontal position such as it would assume when resting on a flat surface;

FIG. 3 is a front elevational view, the view being in the direction of line 3—3 of FIG. 2;

FIG. 4 is a rear elevational view taken in the direction of line 4—4 of FIG. 2, a portion of the body being broken away to expose the left weight member with the right weight member being shown in phantom outline;

FIG. 5 is a bottom plan view of the device;

FIG. 6 is a sectional view taken in the direction of line 6—6 of FIG. 2, and

FIG. 7 is a sectional view taken in the direction of line 7—7 of FIG. 6.

DESCRIPTION OF THE PREFERRED EMBODIMENT

From FIG. 1 it will be discerned that my retriever has been generally denoted by the reference numeral 10. It is shown as being attached to one end of a fishline 12. The water line has been given the reference numeral 14. Consequently, in actual use, the retriever 10 assumes an angle such as that appearing in FIG. 1 as it is being pulled through the water preparatory to snagging or impaling a downed water fowl (not shown).

FIG. 2 differs from FIG. 1 not only in that it is a sectional view but also that the retriever 10 is horizontally oriented rather than tilted as pictured in FIG. 1. It is believed that the orientation of FIG. 2 and the corresponding relationship of the other views with respect to FIG. 2 will facilitate the ensuing description. At any rate, the retriever 10 comprises an elongated buoyant body 16, such as of expanded polyethylene, the use of plastic lending itself readily to mass-producing the item.

Adjacent the forward end of the body are a pair of laterally projecting wings 18 which provide a more accurate flight during casting and which minimize the likelihood of weed entanglement during retrieval. A pair of laterally spaced keels 20 extend along the bottom of the body 16, there being a groove 22 formed between the two keels 20.

Still further, the front end of the body is formed with a sloping face 24, the face 24 inclining upwardly and forwardly from the bottom or keel side of the body. Integral with the sloping face 24 is a box-like projection 26 having a passage 28 extending longitudinally therethrough, the rectangular cross section of the passage 28 being most easily understood from FIG. 7.

The box-like projection 26 functions as a holding means for a hook unit 30. The hook unit 30 may be of conventional construction, including a pair of barbed bills or hook ends 32, a pair of straight shanks 34 and a bight 36 forming an eyelet through which an eye screw 38 is inserted and to which the fishline 12 can be readily attached. The eye screw 38 is formed with a threaded shank 40, preferably of the self-tapping type, which extends into the body 16. The forward portion of the shank 40 assures the retention of the hook unit 30 so that it will not inadvertently become separated from the body 16. In this way, the shanks 34 are retained in juxtaposition with the face 24, assuming the same slope or inclination of the face. The curvature of the bills or hook ends 32 prevent the shanks 34 from being pulled through the passage 28 by the line 12. The screw 38, as indicated, prevents the shanks 34 from moving downwardly, yet when taken out by simply unscrewing it, it then frees the bight 36 for movement downwardly through the passage 28 to thus enable complete removal of the hook unit 30 for replacement or sharpening.

From FIGS. 4 and 5 it will be seen that the body 16 is formed with two cored recesses 42 which contain weight members 44. The weight members 44 are in the form of cylindrical plugs which can be adhesively secured within the recesses 42. The plugs or weight members 44 are substantially the same size as the cross section of the recesses 42 and lend themselves readily to being retained within the recesses by dipping the members 44 into a so-called hot melt adhesive. The adhesively coated weights or plugs 44 are then positioned within the recesses 42 and when the adhesive sets the weights are permanently retained within the body 16. Lead, steel or adhesively bonded together sand can conveniently constitute the material used for the weightss. The amount of weight or mass will depend upon the buoyancy or density of the particular plastic material that is employed for the body 16.

For the sake of discussion, it will be assumed that the longitudinal center of gravity of the body 16 without the weights 44 present extends generally along the dashed line 46 appearing in FIG. 2. This line appears as a point or dot in the rear view constituting FIG. 4. Consequently, as can be readily understood from FIG. 4, the weight members 44 are below the center of gravity 46 and to either side thereof. Coupled with the stabilization provided by the keels 20, the location of the two weight units 44 prevents any objectionable amount of roll about the center of gravity 46. Of course, the presence of the weights 44 change the center of gravity, actually lowering the center of gravity from the point 46. Also, as is believed obvious, the presence of the weights 44 shift the transverse center of gravity (denoted by the dashed line 48 in FIG. 3 and appearing as a point in FIG. 2) of the body 16 rearwardly so as to provide the angle or tilt shown in FIG. 1.

Operation

Having presented the foregoing description, the manner in which my duck retriever 10 functions or operates should be readily understood. Nonetheless, a description of the actual use should contribute to a complete understanding of the benefits to be derived.

All that the hunter need do is to tie or fasten the eye of the screw 38 of the retriever 10 to the end of a conventional fishline which has been labeled 12 in FIG. 1. Assuming that the fishline 12 is wound on the reel of a rod, then the retriever 10 can be readily cast in the direction of the water fowl that the hunter has successfully shot down. In casting, he casts past the floating bird and depending upon his accuracy he can then either immediately wind in the line 12 or he can walk along the shore (or, if expedient to do so, move his boat) so that the bird is between the retriever 10 and where the hunter is stationed. If the bird has fallen into a river, use of the current can be made in aligning the retriever 10 with the bird.

Having achieved fairly good alignment, the fishline 12 is then wound in. As the retriever 10 approaches the bird, the hunter will note when the retriever 10 approaches to within inches of the duck. At that time the hunter sharply jerks the retriever 10 via the line 12 so that the hook ends 32 impale the bird, thereby enabling it to be safely retrieved.

Continued winding in of the line 12 will bring the retriever 10 and duck to shore. Impaling the duck with the sharp tug that has been mentioned assures that the duck will remain hooked, even when the duck has to be pulled through shoreline weeds, over mud beds and rocks, all without danger of losing the bird. Stated somewhat differently, the hook unit 30 is fully set by the initial jerk and remains so during the subsequent pulling procedure.

The hunter then continues the retrieving action by winding in more fishline 12 which pulls the retrieving device 10 and the now captive bird toward him. He does this until he can pick up the bird. The hook unit 30 can then be dislodged without damage to the fowl.

It is contemplated that the hook unit 30 will be of conventional construction. If for any reason the hook unit 30 must be replaced, then the hunter can remove the screw 38. When this has been done, the hunter may grasp the hook ends 32, pulling the eyelet 36 down through the rectangular passage 28. The process is reversed in putting in a new hook unit 30 or after the old hook unit has been sharpened. It is planned that the original divergence of the shanks 34 will be such that their natural resiliency biases them outwardly against the sides of the passage 28. The curvature of the bills or hook ends 32, as earlier explained, anchor the hook unit 30 so that it will not move upwardly. The eye screw 38, as already explained, precludes unwanted reverse movement.

I claim:

1. A duck retriever comprising an elongated buoyant body for attachment to a fish line having an upwardly sloping face at its forward end, hook means located at the forward end of said body having at least one hook end projecting forwardly from said forward end, said hook means having a relatively straight shank and said one hook end being integral with one end of said shank, means holding said shank in juxtaposition with said face so that said shank extends along said sloping face, said hook end projecting forwardly from said sloping face, and weight means located adjacent the rear of said body.

2. A duck retriever in accordance with claim 1 in which said hook means has an eyelet at the other end of said shank.

3. A duck retriever in accordance with claim 2 including an eye screw extending through said eyelet into the upper portion of said body to provide attachment for the fishline.

4. A duck retriever in accordance with claim 2 in which said hook means includes an additional shank extending along said sloping face with the lower ends of said shanks terminating in said one hook end and a second hook end, both of said hooked ends being barbed.

5. A duck retriever in accordance with claim 4 in which said holding means releasably retains said hook means in place.

6. A duck retriever in accordance with claim 1 in which the bottom of said body is formed with a pair of laterally spaced keels extending longitudinally throughout substantially the entire length of said body and forming a downwardly facing groove therebetween.

7. A duck retriever in accordance with claim 6 in which said body is provided with a pair of laterally extending wings adjacent the forward end thereof.

8. A duck retriever in accordance with claim 6 in which said weight means includes at least one weight member located below the horizontal center of gravity of said body.

9. A duck retriever in accordance with claim 6 in which said weight means includes a pair of weight members located to either side of said center of gravity.

10. A duck retriever in accordance with claim 9 in which each of said weight members is in general vertical alignment with a keel.

11. A duck retriever comprising a solid plastic buoyant body having laterally extending wings near the forward end thereof residing above the longitudinal center of gravity of said body and having a pair of laterally spaced keels extending along substantially the entire bottom thereof, a hook member having a hook end, means for attaching said hook member adjacent the forward end of said body so that the hook end of said hook member extends forwardly of the forward end of said buoyant body, and weight means carried near the rear end of said body residing below the longitudinal center of gravity.

12. A duck retriever in accordance with claim 11 including means for attaching a fishline to the forward end of said body above the longitudinal center of gravity.

13. A duck retriever in accordance with claim 12 in which said means for attaching a fishline constitutes part of the hook member when said hook member is held by said hook attaching means.

14. A duck retriever in accordance with claim 13 in which said forward end of the body slopes upwardly from said keels, said hook member having a generally straight shank and said hook attaching means holding said shank so that it assumes an inclination corresponding to the slope of said forward end.

15. A duck retriever comprising an elongated buoyant body, means located at the forward end of said body for attachment to a fish line, hook means also located at the forward end of said body having at least one hook end projecting forwardly and away from said forward end, said hook end being at a lower elevation than said attachment means, and weight means located adjacent the rear end of said body.

* * * * *